No. 883,469. PATENTED MAR. 31, 1908.
G. A. McKEEL.
ROLLER BEARING.
APPLICATION FILED FEB. 16, 1905.
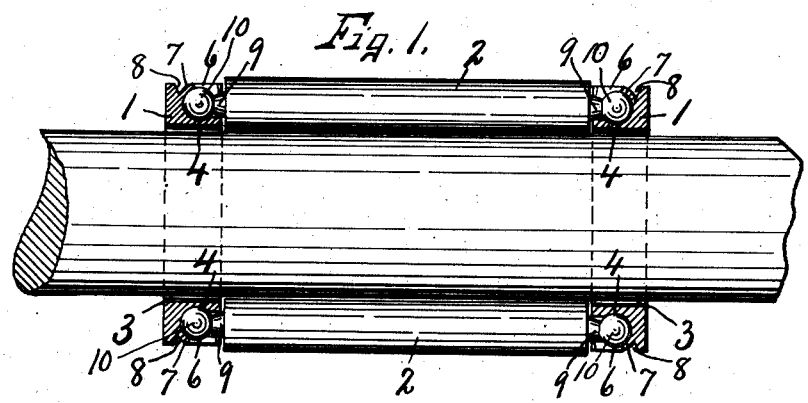
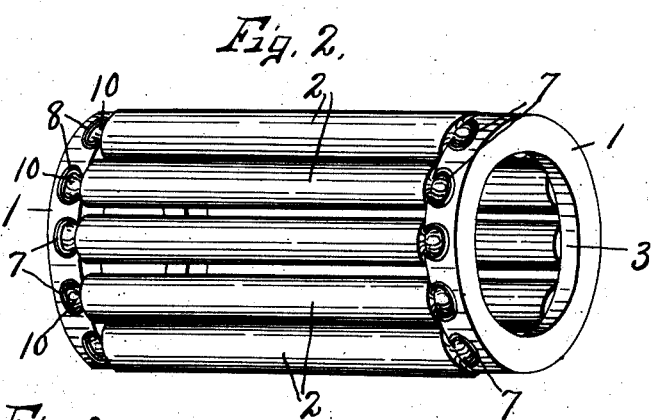
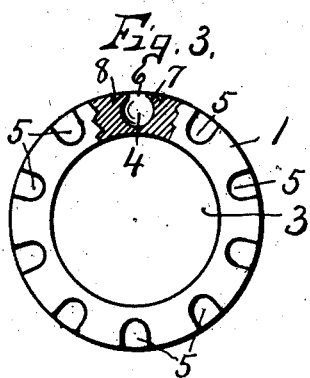
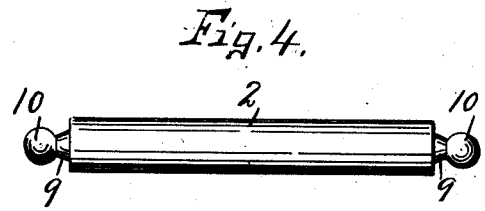
WITNESSES
A. D. Allen
B. E. Robinson
INVENTOR
George A. McKeel
BY
Howard P. Denison
ATTORNEY

UNITED STATES PATENT OFFICE.

GEORGE ASA McKEEL, OF JACKSON, MICHIGAN, ASSIGNOR TO GEORGE A. McKEEL & COMPANY, LIMITED, OF JACKSON, MICHIGAN, A PARTNERSHIP ASSOCIATION.

ROLLER-BEARING.

No. 883,469.

Specification of Letters Patent.

Patented March 31, 1908.

Application filed February 16, 1905. Serial No. 245,894.

*To all whom it may concern:*

Be it known that I, GEORGE ASA MCKEEL, of Jackson, in the county of Jackson, in the State of Michigan, have invented new and useful Improvements in Roller-Bearings, of which the following, taken in connection with the accompanying drawings, is a full, clear, and exact description.

This invention relates to improvements in roller-bearings which are specifically adapted for use on automobiles and other vehicles, but are equally useful in other relations, either as an internal or external bearing.

My object is to produce a simple, self-contained roller-bearing in which the rollers are retained in parallel relation by a pair of end rings which are themselves retained in parallel planes by the rollers, thereby avoiding the necessity for extra tie-rods or equivalent devices, and at the same time avoiding the liability of breakage and impairment incidental to the use of separate holding devices.

The object is carried out by providing open sided approximately semi spherical sockets in the retaining rings and crimping the open sides of the sockets inwardly around the necks of the ball-ended rollers so that the wall of each socket embraces and incloses the greater portion of one of the balls, thereby preventing endwise displacement of the heads and holding the rollers parallel with each other.

In the drawings—Figure 1 is a longitudinal sectional view of my improved roller-bearing showing a portion of a shaft as mounted thereon. Fig. 2 is a perspective view of the detached roller-bearing as seen in Fig. 1. Fig. 3 is an inner end face view of one of the retainer or separator-rings. Fig. 4 is a face-view of one of the detached rollers.

This roller-bearing consists essentially of a pair of separate metal rings —1— and a series of steel cylindrical rollers —2— arranged concentrically with the axis of the rings and having their ends journaled in the rings.

The rings —1— are identical in structure and are each formed with a central shaft-opening —3— and a series of open sided approximately semi spherical pockets or recesses —4— which are all uniform in diameter and spaced equidistantly apart circumferentially, and open through the inner end faces and periphery of the ring.

The inner end openings, as —5—, are of slightly less width than the spherical recesses and the peripheral openings, as —6—, are also of less width than said recesses, but the greater portion of each opening —6— is surrounded by a marginal flange —7— which is made by milling or otherwise forming a channel —8— in the periphery of the ring around and concentric with each opening —6— so as to leave the edge of the flange —7— comparatively thin.

Each opening —6— is first made of substantially the same diameter as its recess —4— to allow the ball ends of the rollers —2— to be easily inserted into said recesses or pockets.

The ends of each roller —2— are formed with reduced necks —9— and ball extremities —10— which are inserted through the openings —6— into the recesses —4—, and the flanges —7— are then drawn or crimped inwardly to reduce the size of the openings —6— to less than the diameter of the balls —10— for the purpose of retaining the ball ends of the rollers permanently in their respective recesses —4—. It is now clear that the ball ends —10— of the rollers —2— are free to revolve in their respective recesses —4— in the rings —1— and that the rings are held in substantially parallel planes against endwise displacement from the ball ends —10— by reason of the fact that the inner end openings —5—, in which the necks —9— revolve, are of less diameter than the ball extremities —10— of the rollers.

It will be observed that the thickness of the rings —1— is less than the diameter of the rollers —2— and that the rollers project both interiorly and exteriorly beyond the bore and periphery of the rings which enables me to use the device as a bearing for both interior and exterior revolving elements.

When used as a bearing for an interior revolving member, as a shaft, the bore in the rings is made slightly greater than the diameter of such shaft and the rollers are arranged with their inner faces in a circle of substantially the diameter of the shaft or slightly less than the bore in the rings.

In making the rings —1— the spherical recesses —4— are milled equidistantly apart circumferentially so as to cut through the periphery and inner end face of the ring to form the openings —5— and —6— after which, a concentric channel is milled around each opening —6— to form the concentric flanges —7—.

The ball-ends —10— of the rollers —2— are then inserted through their respective openings —6— in the recesses —4—, whereupon the flanges —7— are crimped or bent inwardly over the ball-ends —10— to permanently hold the rollers and rings in operative relation to each other.

Having thus described my invention, what I claim and desire to secure by Letters Patent is—

1. In a roller bearing, two rings spaced apart and each provided on its inner face with a plurality of approximately semi-spherical spaced recesses opening through the periphery of the rim, each of said rings having a channel in the periphery surrounding each opening to form a marginal flange at the upper end of the opening, rollers having ball-ends bearing in said recesses, the said flanges on the periphery of the rings surrounding said recesses overlapping the ball-ends of the rollers and forming the upper wall of the ball seat and also holding the rollers in position in the rings.

2. In a roller bearing, two rings spaced apart and provided with a plurality of approximately semi-spherical spaced recesses in their inner faces, the inner ends of said recesses being of slightly less width than those of the recesses, the said recesses being open through the periphery of the rings, and said rings having channels surrounding the recesses to form flanges, rollers having balls at their ends seated in said recesses and having necks seated in the inner ends of the recesses, the said flanges formed on the rings extending over the ball-ends to form a part of the bearing wall therefor and hold the balls in the recesses.

In witness whereof I have hereunto set my hand this 2d day of February, 1905.

GEORGE ASA McKEEL.

Witnesses:
WINTHROP WITHINGTON,
WM. SPARKS.